N. GUNTURÍZ Y SANTOS.
JUICE EXTRACTOR.
APPLICATION FILED FEB. 24, 1919.
1,345,963.
Patented July 6, 1920.
3 SHEETS—SHEET 1.
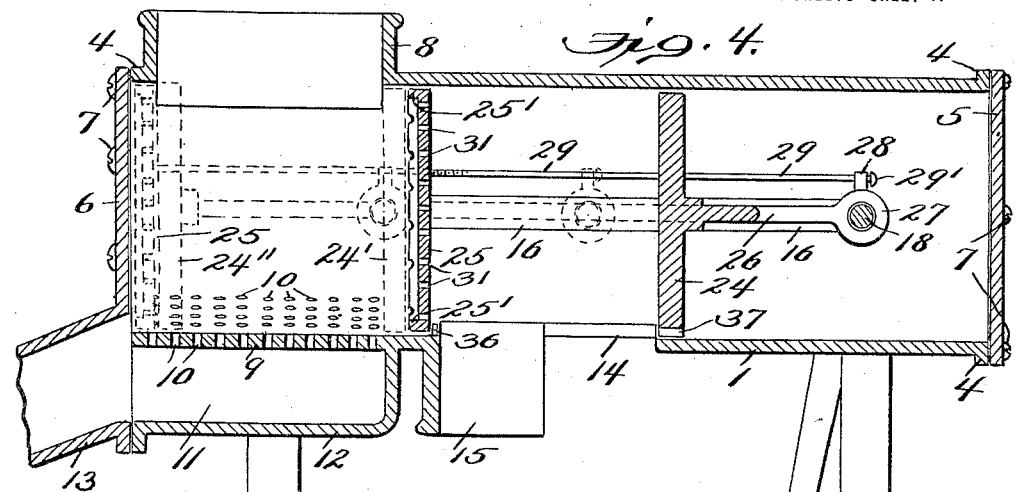
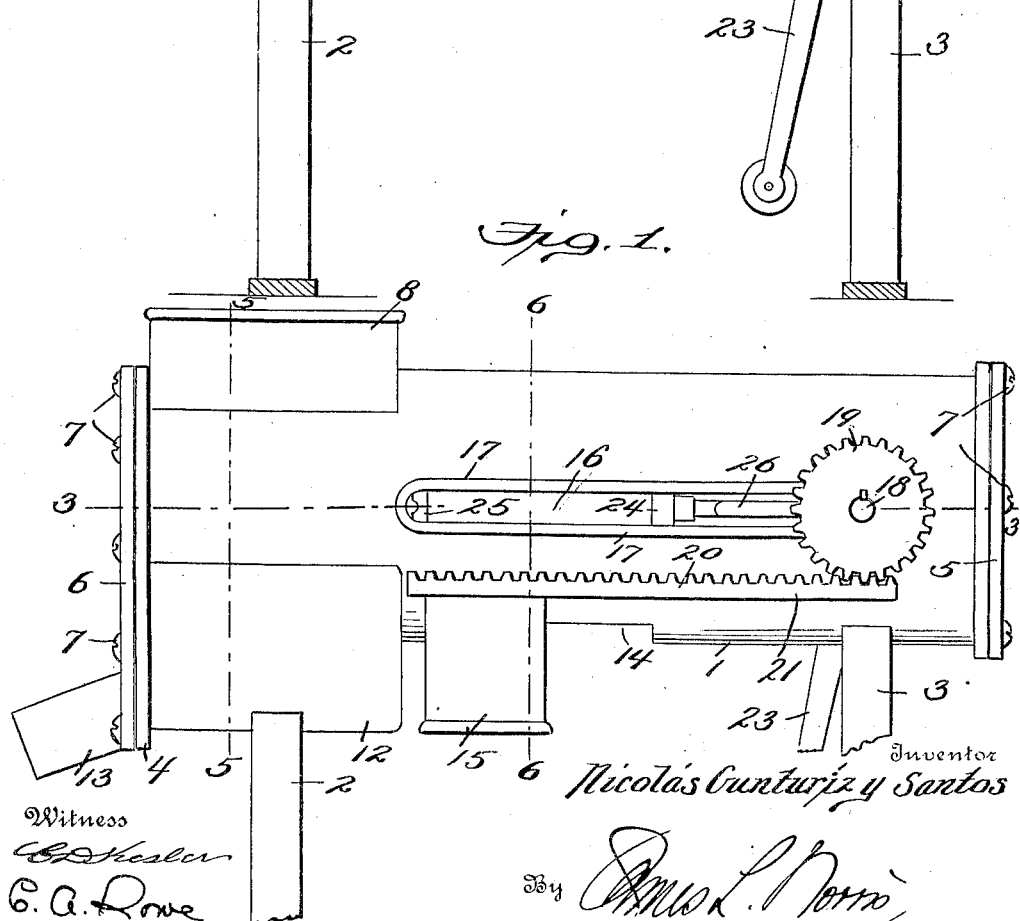

N. GUNTURÍZ Y SANTOS.
JUICE EXTRACTOR.
APPLICATION FILED FEB. 24, 1919.
1,345,963.
Patented July 6, 1920.
3 SHEETS—SHEET 2.
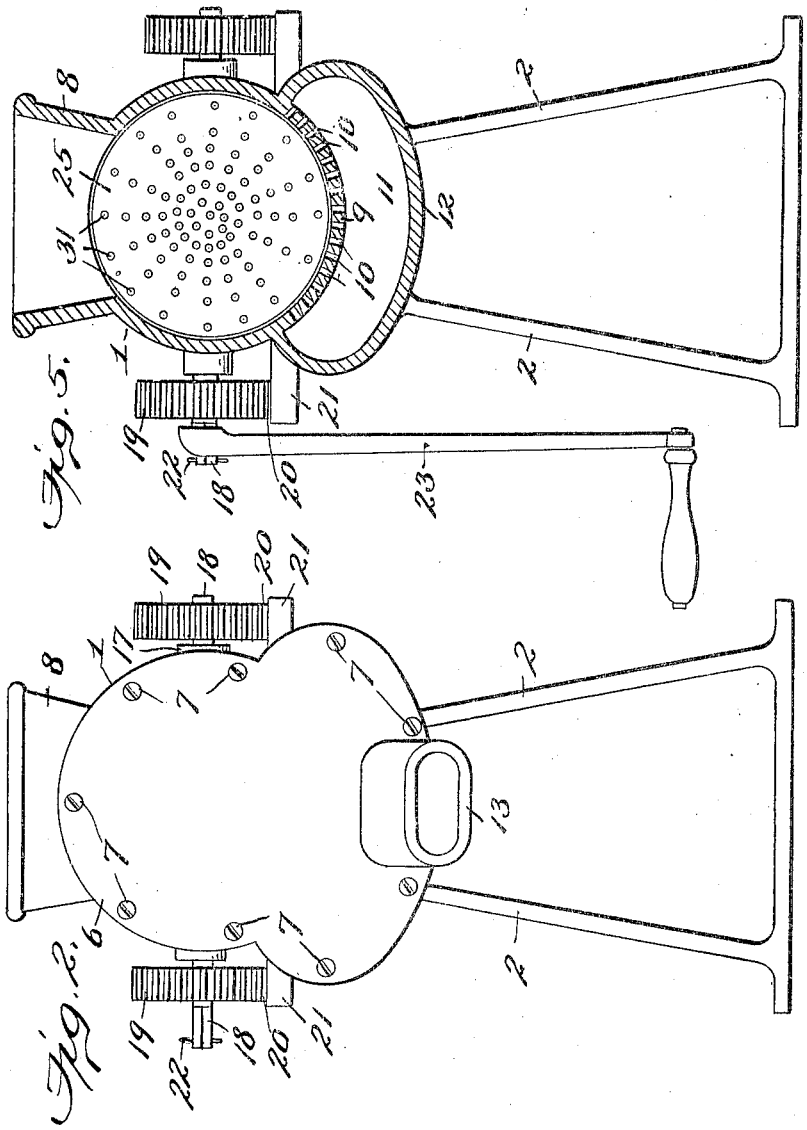

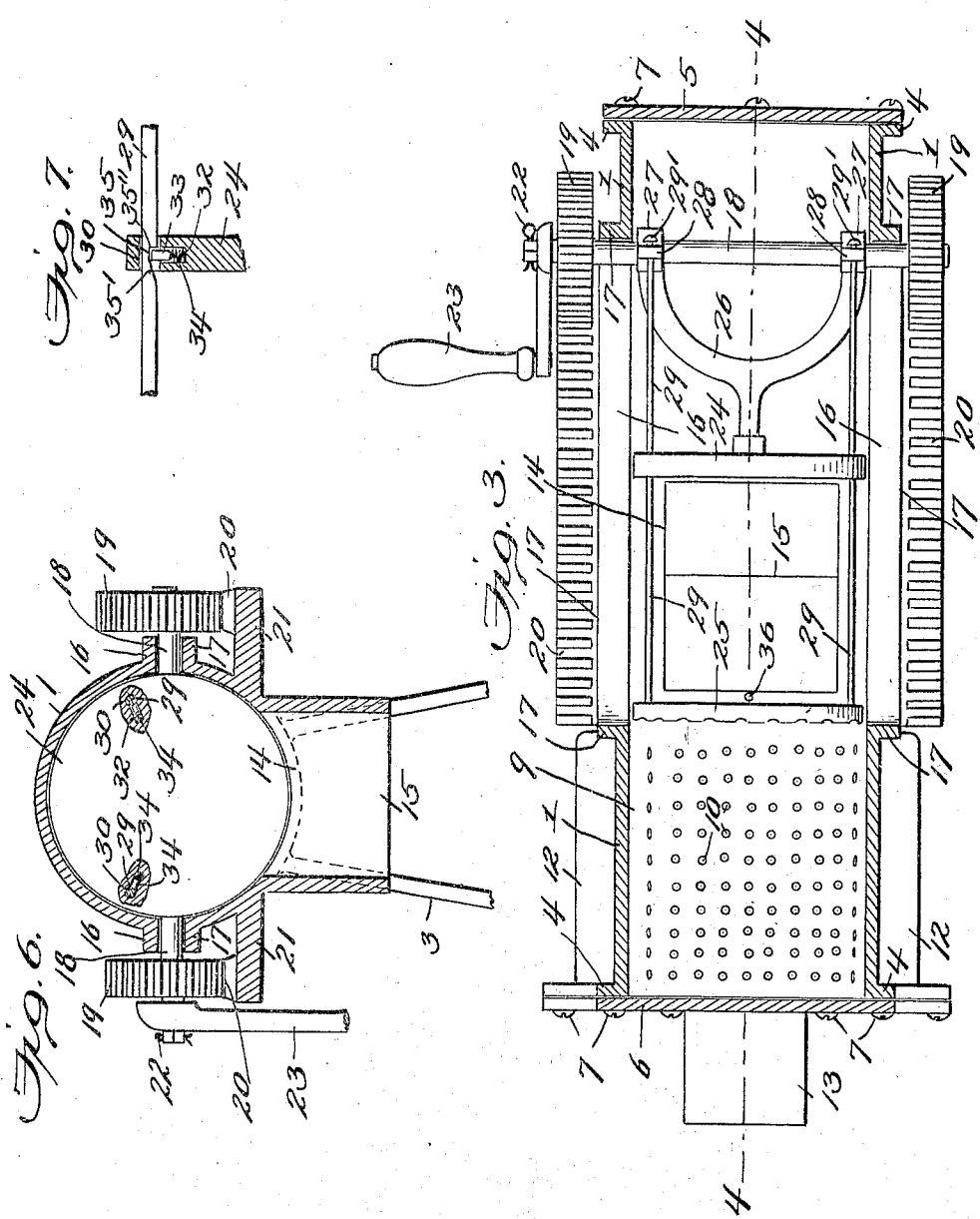

UNITED STATES PATENT OFFICE.

NICOLÁS GUNTURÍZ Y SANTOS, OF SAGUA LA GRANDE, CUBA, ASSIGNOR OF ONE-HALF TO ANTONIO M. CARABALLO, OF SAGUA LA GRANDE, SANTA CLARA, CUBA.

JUICE-EXTRACTOR.

1,345,963.     Specification of Letters Patent.     Patented July 6, 1920.

Application filed February 24, 1919. Serial No. 278,651.

*To all whom it may concern:*

Be it known that I, NICOLÁS GUNTURÍZ Y SANTOS, a citizen of the Republic of Cuba, and a resident of Sagua la Grande, Province of Santa Clara, Republic of Cuba, have invented certain new and useful Improvements in Juice-Extractors, of which the following is a specification.

This invention relates to juice extractors, particularly to those designed for extracting juice from fruits, and its object is to provide a device of novel construction in which the fruit is expressed and the juice percolates from the apparatus during the movement in one direction of a reciprocating piston comprising two sliding plates between which the pulp or fruit to be expressed is fed and the bagasse from the expressed pulp or fruit is discharged during the movement in the opposite direction of the same piston, whereby rapidity and efficiency is obtained in the operation of expressing the fruit or pulp.

The invention is described with reference to the figures of the annexed drawing, in which:

Figure 1 is a side elevation of the juice extractor forming the subject-matter of this invention.

Fig. 2 is an end elevation thereof.

Fig. 3 is a horizontal section of the device on line 3—3 of Fig. 1.

Fig. 4 is a longitudinal vertical section on line 4—4 of Fig. 3.

Fig. 5 is a cross-vertical section of the device on line 5—5 of Fig. 1.

Fig. 6 is a section taken on lines 6—6 of Fig. 1.

Fig. 7 is a detail section of one of the plates and one of the rods guiding the same.

This device comprises a horizontal cylindrical casing 1 supported on two standards 2 and 3 spaced apart, said casing having each end opened and provided with a projecting flange 4, this flange serving as a seat for the vertical end covers 5 and 6 which are secured on said flanges by means of screws 7. The casing is divided lengthwise in three approximately equal parts, viz: two end parts and a central part. The forward end part which is adjacent to cover 6 forms a chamber where the fruit or pulp is expressed; the central part forms a chamber where the discharge of the bagasse is effected and the other or rear end part forms a chamber containing part of the driving mechanism. In the forward part the cylindrical casing 1 is provided at its upper portion with a hopper 8 to receive the fruit or pulp to be expressed and said part has a plurality of perforations 10 in its bottom 9 through which perforations the juice passes to an auxiliary casing 11 formed by a curved bottom 12 beneath the perforated bottom 9, the juice being discharged from said auxiliary casing 11 through an inclined conduit 13 formed in the cover 6 and which extends above the bottom 9 of casing 1. The lower central part of the casing has an opening 14 throughout its length and adjacent to the auxiliary casing 11, a discharge conduit 15 for the bagasse is provided. Horizontal slots 16, each provided with a surrounding projecting flange 17, are formed in the walls of the central and rear parts of the casing 1, these flanges serving to support and guide a horizontal shaft 18 which passes through said grooves 16 and having gear wheels 19 mounted securely at its ends outside of said flanges 17. The gear wheels 19 mesh with horizontal racks 20 formed on the edge of horizontal platforms 21 projecting from the sides of the cylindrical casing 1, and a handle 23 for rotating the horizontal shaft 18 is secured to a square end of said shaft by means of a pin 22.

Inside of casing 1 are two sliding vertical plates 24 and 25 which fit loosely with the walls of said casing, the plate 24 preferably being imperforate and secured at its center to a horizontal fork-shape supporting arm 26 provided at its ends with bearings 27 for the transverse shaft 18. Projecting upwardly from the bearings 27 are lugs 28 having apertures through which slidable longitudinal rods 29, preferably two in number, extend, and which terminate in heads 29'. The rods 29 pass through apertures 30 in the solid plate 24 and have their opposite ends secured to the other vertical plate 25 which is provided with a peripheral flange 25' on that side which faces the cover 6. The plate 25 also has a plurality of perforations 31 therethrough to permit the escape of the juice from the pulp or fruit expressed in the casing 1 by the pressure of the integral or solid plate 24 against the material between plates 25 and 24. The plate 24 will be referred to hereinafter as the pressing plate and the plate 25 will be called percolating plate.

In order to secure the pressing plate 24 to the guiding rods 29 during a part of the sliding movement of the driving mechanism of the plates 24 and 25, the plate 24 (Fig. 7) is provided with a radial recess 32 intersecting each of the apertures 30 and a pin or stem 33 in each of said recesses is pressed outwardly by a helical spring 34 arranged between each stem 33 and the bottom of its recess 32 to enter recess 35 formed in one of the rods 29. The cavity 35 has a beveled cut 35' at its end facing the percolating plate 25 and at the opposite end a straight cut 35". The bottom 9 of casing 1 is provided at the edge of the opening 14 adjacent to the perforations 10 with a small upwardly directed stem 36 which serves as a stop for the percolating plate 25 in its rearward movement, but the pressing plate has a notch 37 through which said stem 36 can pass, to permit the movement of the pressing plate in either direction past said pin.

The operation of the device is as follows: assuming that the two plates 24 and 25 are in their normal position shown in Fig. 3 and in full lines in Fig. 4 when the handle 23 is rotated to the right the gear wheels 19 move forward on the racks 20 and carry along with them the horizontal cross-shaft 18 and with the latter the pressing plate 24 by reason of its being rigidly connected to said shaft by means of arm 26. At the same time the percolating plate 25, by virtue of its rigid connection to the longitudinal rods 29 and on account of the latter being secured to the pressing plate 24 through the insertion of pins 33 in the recesses 35 of said rods 29, is moved forwardly. In this advance of the two plates 24 and 25, when the marginal flange 25' of the percolating plate 25 strikes against the end cover 6 the plate 25 is prevented by the cover 6 from advancing farther. The pressing plate 24 is now in the position 24' shown by dotted lines on Fig. 4 of the drawings. The pulp or fruit to be expressed between plates 24 and 25 is now fed between said plates through the hopper 8. The rotation of the handle 23 is then continued so that the wheels 19 may continue their advance on racks 29 and, since the percolating plate 25 and the horizontal rods 29 remain stationary on account of their rigid connection thereto, the pressing plate 24 is freed from the rods 29, because when being pushed ahead, the projecting ends of its pins or stems 35 slide on the beveled cuts 35' of recesses 35 against the elastic action of the springs 34, and said plate 24 continues its advance toward the percolating plate 25, whereby it presses against the latter the pulp or fruit inserted between them, the juice extracted percolates through the perforations 10 of bottom 9 of casing 1 into the auxiliary casing 11 and through the perforations 31 of the percolating plate 25 to the space between the latter and the cover 6, wherefrom the juice falls directly into the conduit 13 and is discharged therethrough into any proper receptacle. At this moment the plate 24 has moved up very near to plate 25, they being spaced apart only by the bagasse of the expressed fruit or pulp, this position being indicated by dotted lines on Fig. 4 of the drawings. It is now necessary to discharge the bagasse lodged between the two plates 24 and 25, and with this object in view the handle 23 is rotated in a reverse direction whereby the gear wheels 19 will rotate back on the racks 20 and carry along with them the shaft 18, which by means of the forked supporting arm 26 will pull back the pressing plate 24 which is separated from the percolating plate 25 by traveling on the longitudinal rods 29 until it attains the position 24' indicated by dotted lines on Fig. 4, at which moment the plate 24 is again held by said rods 29, by reason of the ends of the pins or stems 33 entering the recesses 35 and engaging straight cuts 35". As the gear wheels 19 move backwardly, the percolating plate 25 and pressing plate 24 as well as the bagasse between said plates move backwardly, and the bagasse, on reaching the edge of the opening 14, falls into the discharge conduit 15 wherefrom it is collected in any convenient receptacle. The stem 36 projecting from the bottom 9 engages the plate 25 and prevents further backward movement of the plates and actuating mechanism.

It is obvious that the form of the casing and of the percolating and pressing plates can be varied and also the percolating plate may be imperforate without departing from the spirit of the invention which is as pointed out in the appended claims.

What I claim is:—

1. A juice extracting device comprising a casing provided with an inlet for the material to be expressed, and having an outlet for the juice and a further outlet for the bagasse, a plurality of plates within said casing and movable collectively and relatively one to the other, and means for giving a reciprocating motion to said plates to express between them when moved in one direction the material fed into the casing and to discharge the juice, and when moved in the opposite direction to discharge the bagasse.

2. A juice extracting device comprising a horizontal casing closed at one end and provided adjacent one end with an inlet for the material to be expressed, and having a perforated bottom for the escape of the juice and also having an outlet for the bagasse, a plurality of plates within the casing normally spaced apart and movable within the casing firstly together then one toward another and finally in a reverse manner, and means for giving reciprocating motion to said plates so as to express the material fed into the casing and to discharge the bagasse when said plates are moved in the opposite direction.

3. A juice extracting device comprising a horizontal casing closed at one end and provided adjacent said end with an inlet for the material to be expressed and having a perforated bottom, an auxiliary casing beneath the perforated bottom to receive the juice, a plurality of plates within the casing normally spaced apart from one another and movable first together toward said closed end, then one relatively to the other and then in a reverse manner, and means for giving reciprocating motion to said plates to express the material fed in the casing between said plates and to discharge the bagasse when said plates are moved within the opposite direction.

4. A juice extracting device comprising a horizontal cylindrical casing closed at one end and provided adjacent said end with an inlet for the material to be expressed, a perforated bottom directly beneath said inlet, an outlet for the bagasse, an auxiliary casing beneath the perforated bottom for receiving the juice percolated therethrough, vertical plates normally spaced apart from each other and from the closed end of the casing, a horizontal shaft transversely mounted in said casing, a supporting arm loosely mounted on said shaft, one plate being rigidly connected to said supporting arm, longitudinal grooves in which said plate is slidable, longitudinally disposed rods rigidly connected to the other of said plate members and passing through the first plate, means in the first mentioned plate for securing the same to said longitudinal rods until said rods have completed their travel, means for automatically releasing said securing means, and means outside of the casing for imparting to said transverse shaft a reciprocating motion along said casing.

5. A juice extracting device comprising a horizontal cylindrical casing closed at one end and provided near this end with an inlet for the material to be expressed, a perforated bottom beneath said inlet, an outlet for the bagasse, an auxiliary casing beneath said perforated bottom for receiving the juice percolated therethrough, a cover on the closed end of the casing provided with a discharging conduit for the juice, which comprises the auxiliary casing and the lower part of the main casing, two vertical plates, one of which is a pressing plate and the other a percolating plate normally spaced apart from each other and from the closed end of the casing, said percolating plate being arranged between the pressing plate and the closed end of the casing, a horizontal shaft transversely mounted in said casing, a supporting arm loosely mounted on said shaft, lugs projecting from said arm, said pressing plate being slidably mounted on grooves along the casing and rigidly connected to said supporting arm longitudinal rods extending through said pressing plate, said percolating plate being rigidly connected to said longitudinal rods and through the lugs projecting from supporting arm and provided with a projecting flange on the side facing the closed end of the casing, means within the pressing plate for securing said plate to said longitudinal rods during the movement of said rods toward the cover of the closed end of the casing, and means for allowing said pressing plate to slide upon said longitudinal rods so that the pressing plate approaches the percolating plate and reciprocally in a reverse manner, and a pair of gear wheels fixed on the projecting ends of the horizontal cross-shaft, and horizontal racks provided at the sides of the casing on which said gear wheels are adapted to move forward and backward.

In witness whereof I affix my signature.

NICOLÁS GUNTURÍZ Y SANTOS.